United States Patent [19]
Ito et al.

[11] Patent Number: 5,254,634
[45] Date of Patent: Oct. 19, 1993

[54] CROSSLINKED COPOLYMER PARTICLES AND PROCESS FOR PRODUCING THE SAME

[75] Inventors: Tsuyoshi Ito; Hiroaki Takayanagi, both of Tokyo; Go Honda, Kanagawa, all of Japan

[73] Assignee: Mitsubishi Kasei Corporation, Tokyo, Japan

[21] Appl. No.: 773,572

[22] PCT Filed: Dec. 6, 1990

[86] PCT No.: PCT/JP90/01583
§ 371 Date: Nov. 8, 1991
§ 102(e) Date: Nov. 8, 1991

[87] PCT Pub. No.: WO92/01721
PCT Pub. Date: Feb. 6, 1992

[30] Foreign Application Priority Data

Jul. 25, 1990 [JP] Japan .................................. 2-197050
Jul. 30, 1990 [JP] Japan .................................. 2-192454

[51] Int. Cl.$^5$ ............................................ C08F 20/20
[52] U.S. Cl. ................................. 525/330.3; 525/329.7; 525/330.1; 525/355; 525/359.1; 525/359.3; 525/359.5; 525/359.6; 525/383; 525/379; 526/320; 526/321; 526/325; 526/332
[58] Field of Search ............... 525/329.7, 325, 330.1, 525/330.3; 526/325, 320

[56] References Cited

U.S. PATENT DOCUMENTS

| | | | |
|---|---|---|---|
| 4,101,461 | 7/1978 | Strop | 521/32 |
| 4,246,362 | 1/1981 | Sasaki | 521/149 |
| 4,256,843 | 3/1981 | Sasaki | 521/53 |

FOREIGN PATENT DOCUMENTS

| | | |
|---|---|---|
| 2197906 | 3/1974 | France . |
| 2259850 | 8/1975 | France . |
| 6055009 | 9/1983 | Japan . |

OTHER PUBLICATIONS

C. R. Noller, "Chemistry of Organic Compounds" 3d Ed, 159, 596–597, (1965) Saunders (Philadelphia).

*Primary Examiner*—Joseph L. Schofer
*Assistant Examiner*—Fred Zitomer
*Attorney, Agent, or Firm*—Sughrue, Mion, Zinn, Macpeak & Seas

[57] ABSTRACT

Crosslinked copolymer particles comprising hydrophilic crosslinked copolymer particles with a hydrophobic functional group being bonded thereto via an oxygen atom derived from a hydroxyl group of said hydrophilic crosslinked copolymer, which are obtained by reacting hydrophilic crosslinked copolymer particles with a reagent for introducing a hydrophobic functional group in an organic solvent capable of swelling said hydrophilic crosslinked copolymer particles, said hydrophilic crosslinked copolymer particles being prepared by suspension polymerization of glycerol monomethacrylate and a crosslinking polyvinyl compound in the presence of an organic solvent, such as a monohydric alcohol having from 5 to 14 carbon atoms. The polymer particles are useful as a carrier for gel-filtration of hydrophilic biopolymers such as proteins and nucleic acids.

16 Claims, No Drawings

CROSSLINKED COPOLYMER PARTICLES AND PROCESS FOR PRODUCING THE SAME

TECHNICAL FIELD

This invention relates to hydrophilic crosslinked copolymer particles obtained from glycerol monomethacrylate as a monomer, hydrophobic crosslinked copolymer particles comprising said hydrophilic crosslinked copolymer particles, as a basic structure, and having adsorption active sites in the side chain thereof, and processes for producing these polymer particles. Specifically, it relates to hydrophobic crosslinked copolymer particles and hydrophilic crosslinked copolymer particles suitable for separation of water-soluble biopolymers such as proteins, and processes for producing the same.

TECHNICAL BACKGROUND

Important requirements for carriers for adsorption separation of water-soluble biopolymers such as proteins (hereinafter referred to as "proteins, etc.") are to have such a chemical structure for the carrier to exhibit sufficient hydrophilic properties, active sites for causing a hydrophobic interaction with proteins, etc., and a proper skeleton structure and a proper specific surface area for efficient contact with proteins, etc.

A crosslinked and insolubilized polysaccharide, e.g., agarose, as a carrier with an alkyl group being introduced is known as such an adsorbent. Having a saccharide chain skeleton, such an adsorbent, however, has insufficient physical strength for industrial use. An adsorbent comprising a porous body, e.g., silica gel, having introduced thereinto a hydrophobic functional group has been proposed, but it is also unsuitable for industrial use due to lack of chemical stability against acid or alkali.

A polymer obtained by reacting glycidyl methacrylate with a crosslinking agent, hydrolyzing the glycidyl group of the resulting crosslinked copolymer, and then reacting the copolymer with a fatty acid chloride is known for use as a carrier for reverse phase partition chromatography as disclosed in JP-A-2-36351 (the term "JP-A" as used herein means an "unexamined published Japanese patent application"). Further, a spherical porous hydrophilic crosslinked polymer obtained by suspension polymerization of a hydrophilic methacrylic ester having at least one ether linkage per molecule with a crosslinking agent is known useful as a carrier for gel chromatography as disclosed in JP-A-60-55009.

However, in the process wherein glycidyl methacrylate is polymerized as a monomer, followed by hydrolysis of the glycidyl group in the presence of a mineral acid, etc. as a catalyst, hydrolysis takes place on not only the glycidyl group but the ester moiety to produce a carboxyl group so that the resulting polymer fails to have sufficient performance properties as a chromatographic adsorbent for proteins, etc. In using a hydrophilic methacrylic ester having the specific structure, there is a problem in that specific polymerization conditions must be selected.

DISCLOSURE OF THE INVENTION

An object of the present invention is to provide novel crosslinked copolymer particles which have hydrophilic properties and moderate hydrophobic properties as well and are therefore useful as a carrier for adsorption separation of proteins, etc. and a process for producing the same.

The crosslinked copolymer particles according to the present invention comprise hydrophilic crosslinked copolymer particles obtained from glycerol monomethacrylate having extremely high hydrophilic properties as a main component and a crosslinking polyvinyl compound, which has a hydrophobic functional group having 4 or more carbon atoms being mainly bonded to the glycerol monomethacrylate via an oxygen atom derived from a hydroxyl group located on said glycerol monomethacrylate.

The hydrophilic crosslinked copolymer particles comprising glycerol monomethacrylate are produced by suspension polymerization of glycerol monomethacrylate and a crosslinking polyvinyl compound in the presence of at least one organic solvent selected from the following (A) and (B).

(A) A monohydric alcohol having from 5 to 14 carbon atoms.

(B) A mono- or multi-valent ester having a solubility parameter of from 8 to 11 $(cal/cm^3)^{\frac{1}{2}}$.

The solubility parameter is defined by the following formula.

$$\left[ \frac{\Delta E \text{ (molar heat of evaporation)}}{V \text{(molar volume)}} \right]^{\frac{1}{2}}$$

The crosslinked copolymer particles according to the present invention are produced by reacting the thus obtained hydrophilic crosslinked copolymer particles of glycerol monomethacrylate with a reagent for introducing a functional group in an organic solvent which is capable of swelling said hydrophilic crosslinked copolymer particles and is miscible with said reagent for introducing a hydrophobic functional group.

BEST MODE FOR CARRYING OUT THE INVENTION

The present invention is hereinafter explained in detail.

The crosslinked copolymer particles of the present invention are produced from hydrophilic crosslinked copolymer particles comprising glycerol monomethacrylate as a main component. The hydrophilic crosslinked copolymer particles can be prepared by suspension polymerization of glycerol monomethacrylate and a crosslinking polyvinyl compound (hereinafter inclusively referred to as "polymerizable monomers") in an aqueous dispersion medium.

The crosslinking polyvinyl compound is a compound containing at least two polymerization active double bonds and includes those usable in general crosslinking reaction, such as ethylene glycol dimethacrylate and divinylbenzene. Of these compounds, polyacrylic or polymethacrylic esters of a polyhydric alcohol are particularly useful. Examples of such ester compounds are ethylene glycol dimethacrylate, triethylene glycol dimethacrylate, glycerol dimethacrylate, and trimethylolpropane trimethacrylate, and corresponding acrylates.

The amount of the polyvinyl compound used as a crosslinking agent, though varying depending on the kind of the polyvinyl compound, usually ranges from 15 to 80%, and preferably from 15 to 70%, based on the total weight of the polymerizable monomers. If the ratio of the crosslinking agent is too small, the resulting crosslinked copolymer particles have excessive swellability and thereby suffer a considerable pressure loss when used in chromatography on an industrial scale. If it is greater than necessary, on the other hand, the resulting copolymer particles have an insufficient capacity of treating proteins due to a reduced water retention, and also the hydrophobic properties assigned to crosslinked parts become higher than necessary, resulting in an increase in non-specific adsorption of proteins.

The hydrophilic crosslinked copolymer particles can be produced in the form of either a gel or a porous body according to selection of polymerization conditions hereinafter described. Where porous particles are produced, there is a tendency that a specific surface area of the resulting copolymer increases according as the amount of the crosslinking agent increases. Occurrence of such a specific surface area is attributed to phase separation within monomer droplets, and such phase separation does not occur unless the amount of a crosslinking agent exceeds a given level inherent to the individual species of the crosslinking agent used. While crosslinking agents to be used in the present invention include polymethacrylic esters of a polyhydric alcohol, the above-mentioned given level can be experimentally confirmed according to the individual crosslinking agent. For example, in the case of an ethylene glycol ester, it is used in an amount of 25% based on the total polymerizable monomers. Accordingly, ethylene glycol dimethacrylate is usually used in an amount ranging from 20 to 70% by weight, and glycerol dimethacrylate is usually used in an amount ranging from 40 to 80% by weight depending on desired properties of the resulting hydrophilic crosslinked copolymer particles.

In the suspension polymerization system, it is necessary that the layer of the polymerizable monomers should contain an organic solvent which is capable of forming a uniform liquid phase with the monomers but is sparingly soluble in the aqueous dispersion medium layer. Such an organic solvent includes monohydric alcohols containing from 5 to 14 carbon atoms and mono- or multi-valent esters having a solubility parameter of from 8 to 11 $(cal/cm^3)^{\frac{1}{2}}$ as defined by the above formula. Monohydric alcohols having 4 or less carbon atoms are easily soluble in water, and those having 15 or more carbon atoms induce too vigorous phase separation, resulting in a failure of smooth suspension polymerization. Solvents having a solubility parameter less than 8 also cause vigorous phase separation. Those having a solubility parameter exceeding 11 are water-soluble, which leads not only to a failure of obtaining spherical particles but sometimes to solidification of the whole reaction bath. Specific examples of the organic solvents which can be used in the process of the present invention include monohydric alcohols having from 5 to 14 carbon atoms, e.g., 1-hexanol, cyclohexanol, 1-octanol, decanol, dodecanol, and tetradecanol; and mono- or multi-valent esters, e.g., glycerol monobutyrate, glycerol tributyrate, glycerol tripropionate, and dimethyl phthalate.

Preferred of these organic solvents are monohydric alcohols, especially cyclohexanol.

The organic solvents may be used either individually or in combination thereof.

The amount of the organic solvent to be used usually ranges from 30 to 300%, and preferably from 50 to 200%, based on the total weight of polymerizable monomers. If the amount of the organic solvent is smaller than the above range, sufficient effects of addition can hardly be produced. If the amount of the organic solvent is larger than the above range, the resulting crosslinked copolymer particles have a decreased strength sometimes unsuitable for use as a chromatographic carrier.

The organic solvent used in the present invention serves to prevent extremely hydrophilic polymerizable monomers from being distributed in an aqueous medium thereby making it possible to produce copolymer particles by ordinary suspension polymerization. At the same time, various characteristics of the resulting copolymer particles, such as a gel form or a porous form, can be controlled by appropriate combinations of the amount, kind, etc. of the solvents used.

The polymerization reaction is not particularly limited and conventional suspension polymerization technique can be applied. That is, suspension polymerization can be carried out in an aqueous medium containing a suitable dispersion stabilizer.

Dispersion stabilizers which can be used include known compounds employed in this type of reaction, such as gelatin, sodium polyacrylate, carboxymethyl cellulose, and polyvinyl alcohol.

The aqueous medium preferably contains a dissolved salt for preventing the polymerizable monomers from being dissolved in the aqueous medium. Examples of useful salts include inorganic salts, e.g., sodium chloride, calcium chloride, and sodium sulfate. Because glycerol monomethacrylate is highly soluble in water, the salt is preferably added in high concentrations. For example, calcium chloride is preferably added in a concentration of from 20 to 40% by weight.

If a weight ratio of the aqueous dispersion medium layer to the polymerizable monomers layer containing the organic solvent (i.e., bath ratio) is too high, the polymerizable monomers are distributed throughout the aqueous dispersion medium, resulting in a reduction of yield. If the bath ratio is too low, suspension of the polymerizable monomers layer in the aqueous medium becomes instable, leading to a failure of obtaining polymer particles. Accordingly, an effective bath ratio ranges from 3:1 to 10:1.

The polymerization reaction is conducted in the presence of an appropriate polymerization initiator. Generally employed polymerization initiators include organic peroxides, e.g., benzoyl peroxide, and organic azobis compounds, e.g., azobisisobutyronitrile.

A suitable concentration of the polymerization initiator is from 0.01 to 5% by weight, and preferably from 0.1 to 1% by weight.

The polymerization reaction usually completes within 6 to 20 hours at a temperature of from 50° to 90° C. with stirring. The resulting hydrophilic crosslinked copolymer is recovered from the reaction bath and washed by an appropriate means and subsequently subjected to the reaction for introducing a hydrophobic functional group. The hydrophilic crosslinked copolymer particles thus obtained usually have a particle diameter of from 5 to 2000 $\mu m$. For particular use as a carrier for industrial chromatography, a particle diameter of from 30 to 500 $\mu m$ is preferred. They usually have a specific surface area of from 30 to 500 $m^2/g$. The hydrophilic crosslinked copolymer particles thus obtained may suffice as such for use as a carrier in some chromatographic conditions.

Introduction of a hydrophobic functional group is carried out in a solvent capable of swelling the crosslinked copolymer. The solvent to be used must be miscible with a reagent for introducing a hydrophobic functional group and also be inert to the introduction reaction. Such a solvent include aromatic solvents, e.g., toluene, ethers, e.g., 1,4-dioxane, tetrahydrofuran, and (di)ethylene glycol dimethyl ether, N,N-dimethylformamide, and dimethyl sulfoxide. The solvent is used in an amount of from 1 to 10 parts by weight per part by weight of the hydrophilic crosslinked copolymer.

The reaction for introducing a hydrophobic functional group is carried out by using a reagent capable of forming a hydrophobic functional group which is reactive to the hydroxyl group in the side chain of the hydrophilic crosslinked copolymer and capable of forming a hydrophobic functional group, such as an alkyl or acyl group having 4 or more carbon atoms, and preferably from 4 to 20 carbon atoms. Examples of such a reagent include organic halogen compounds, such as alkyl halides, e.g., butyl chloride and octyl chloride, and aralkyl halides, e.g., phenethyl chloride. Carboxylic acid derivatives including halides and anhydrides are particularly useful. Octadecanoyl chloride, octanoyl chloride, and benzoyl chloride are particularly preferred. The above-described reagent is reacted with the hydroxyl group in the side chain of the hydrophilic crosslinked copolymer to form a hydrophobic functional group via an oxygen atom derived from the hydrophilic crosslinked copolymer. Therefore, the hydrophobic functional group is generally bonded to the crosslinked copolymer via an ether linkage or an ester linkage.

The hydroxyl group in the side chain as above referred to includes not only the hydroxyl group of the glycerol moiety of glycerol monomethacrylate but, where glycerol dimethacrylate is used as a crosslinking polyvinyl compound, the hydroxyl group remaining in the glycerol moiety of glycerol dimethacrylate. The reagent is used in an amount of from 0.01 to 3 equivalents, and preferably from 0.05 to 1 equivalent, to the glycerol residual group (hydroxyl group) of the glycerol monomethacrylate crosslinked copolymer.

. It is preferable that a basic substance be present in the reaction system for introducing a hydrophobic functional group. A basic substance is effective to accelerate the reaction for introducing a hydrophobic functional group and also to neutralize an acidic substance by-produced. Examples of particularly useful basic substances include tertiary amines, e.g., pyridine and trialkylamines. The basic substance is usually used in an amount of from 0.1 to 3 equivalents, and preferably from 0.5 to 1.5 equivalents, to the reagent for introduction of a hydrophobic functional group.

The reaction for introducing a hydrophobic functional group is conducted at a temperature of from 10° to 50° C. and completes in a period of from 0.5 to 5 hours. The resulting crosslinked copolymer particles are washed in an appropriate manner for use.

The crosslinked copolymer particles after introduction of a hydrophobic functional group usually have a particle diameter of from 5 to 2000 $\mu$m. For particular use as a carrier for industrial chromatography, a particle diameter of from 30 to 500 $\mu$m is particularly desirable.

The present invention is now illustrated in greater detail with reference to Examples, but the present invention is not construed as being limited thereto.

I. Production of Hydrophilic Crosslinked Copolymer:

EXAMPLE 1

In 100 g of cyclohexanol were dissolved 85 g of glycerol monomethacrylate, 15 g of glycerol dimethacrylate, and 0.5 g of 2,2'-azobis(2,4-dimethylvaleronitrile). The resulting solution was added to 1200 ml of an aqueous solution containing 300 g of calcium chloride, 12 g of polyvinyl alcohol, and 0.012 g of sodium nitrite and suspended therein. The suspension was allowed to react at 65° C. for about 6 hours to obtain white, spherical, and porous particles having an average particle diameter of about 250 $\mu$m.

Gel-filtration was carried out using the thus produced particles according to the following method, and a molecular weight of exclusion limit was obtained.

A glass column of 0.8 cm in inner diameter and 30 cm in height was used. Desalted water was used as a developing solution and passed at a flow rate of 0.5 cc/min. As a sample, 0.1 cc of a 1 w/v% solution of polyethylene glycol or dextran whose molecular weight is known was used. The eluate was analyzed by means of a differential refractometer, and a molecular weight of exclusion limit was obtained from the relationship between time of elution and molecular weight. The molecular weight of exclusion limit was found to be about 1,000,000.

EXAMPLE 2

Suspension polymerization was conducted in the same manner as in Example 1, except for using 70 g of glycerol monomethacrylate and 30 g of glycerol dimethacrylate. There were obtained white, spherical, and porous particles. As a result of gel-filtration, the molecular weight of exclusion limit was found to be about 500,000. The resulting particles had a specific surface area of 2 m$^2$/g as measured by BET method using nitrogen gas.

EXAMPLE 3

White, spherical, and porous polymer particles were obtained in the same manner as in Example 1, except for replacing cyclohexanol as an organic solvent with the same weight of 1-decanol.

As a result of gel-filtration, the molecular weight of exclusion limit was about 100,000.

EXAMPLE 4

White, spherical, and porous polymer particles were obtained in the same manner as in Example 1, except for replacing cyclohexanol as an organic solvent with the same weight of glycerol tributyrate (solubility parameter: 8.2). The molecular weight of exclusion limit was about 30,000.

EXAMPLE 5

White, spherical, and porous polymer particles were obtained in the same manner as in Example 1, except for replacing cyclohexanol as an organic solvent with the same weight of glycerol tripropionate (solubility parameter: 8.7). The molecular weight of exclusion limit was about 30,000.

EXAMPLE 6

White, spherical, and porous polymer particles were obtained in the same manner as in Example 1, except for replacing cyclohexanol as an organic solvent with the same weight of 1-tetradecanol. The molecular weight of exclusion limit was about 50,000.

COMPARATIVE EXAMPLE 1

The same procedures as in Example 1 were followed, except for replacing cyclohexanol as an organic solvent with the same weight of 1-butanol. As a result, the whole polymerization bath solidified, resulting in a failure of obtaining spherical particles.

COMPARATIVE EXAMPLE 2

The same procedures as in Example 1 were followed, except for using ethyl n-caprylate (solubility parameter: 7.3) as an organic solvent. As a result, the viscosity of the whole bath increased, and the particles could not be recovered.

EXAMPLE 7

In 100 g of cyclohexanol were dissolved 70 g of glycerol monomethacrylate, 30 g of ethylene glycol dimethacrylate, and 1.0 g of 2,2'-azobis(2,4-dimethylvaleronitrile). The resulting solution was added to 600 ml of desalted water having dissolved therein 150 g of calcium chloride, 6 g of polyvinyl alcohol, and 0.006 g of sodium nitrite and suspended therein. The suspension was allowed to react at 65° C. for about 6 hours to obtain 89 g of white, spherical, and porous particles having an average particle diameter of about 150 μm.

The particles had a specific surface area of 48.3 m²/g as measured by the nitrogen adsorption (BET) method.

The resulting resin was packed in a glass column, and gel-filtration chromatography was conducted using desalted water as an eluent. As a result, the molecular weight of excluded dextran was about 500,000.

EXAMPLE 8

Suspension polymerization was conducted in the same manner as in Example 7, except for using 50 g of glycerol monomethacrylate and 50 g of glycerol dimethacrylate. There were obtained white, spherical, and porous particles. The resulting particles had a specific surface area of 65.5 m²/g.

EXAMPLE 9

The same procedures as in Example 7 were followed, except for using 30 g of glycerol monomethacrylate, 70 g of ethylene glycol dimethacrylate, and 150 g of cyclohexanol, to obtain white, spherical, and porous particles. The resulting particles had a specific surface area of 257 m²/g.

II. Introduction of Hydrophobic Group:

EXAMPLE 10

The polymer particles obtained in Example 7 were dried, and a 30 g aliquot thereof was added to 120 g of 1,4-dioxane. To the mixture was added 13.5 g of triethylamine, followed by stirring at 25° C. for 1 hour. A solution of 40.5 g of octadecanoyl chloride in 33.3 g of 1,4-dioxane was then added thereto dropwise, and the mixture was allowed to react at 25° C. for 1 hour to obtain white porous particles. The water content of the particles was 46.0%.

The resulting particles were buffered in a 0.1M tris-hydrochloric acid buffer (pH=7.5), and a 5 ml aliquot thereof was centrifuged to remove the adhered buffer. The particles were then brought into contact with 100 ml of the same buffer containing 0.2 g of bovine serum γ-globulin and 7.5 g of ammonium sulfate at 10° C. for 6 hours. γ-Globulin concentrations before and after the contact were determined from the absorbance at 280 nm. γ-Globulin adsorbability of the particles was 24.8 mg/ml-particle as calculated from the difference.

COMPARATIVE EXAMPLE 3

Polymerization was conducted in the same manner as in Example 10 to obtain a copolymer. The resulting copolymer had a water content of 59.9%. Bovine serum γ-globulin adsorbability of the particles was 4.4 mg/ml-particle as determined in the same manner as in Example 1.

UTILITY IN INDUSTRY

The crosslinked copolymer particles obtained by the present invention generally have a particle diameter of from 5 to 2000 μm, show an elimination critical molecular weight of from several tens of thousands to about one million for polyethylene glycol or dextran, and have moderate hydrophilic properties and hydrophobic properties. Hence, the particles can be utilized as a carrier of gel-filtration of water-soluble biopolymers such as proteins, peptides, nucleic acids, and polysaccharides. The particles having a particle diameter of from 30 to 500 μm are particularly useful as a carrier for chromatography on industrial scale.

We claim:

1. Crosslinked copolymer particles comprising hydrophilic crosslinked copolymer particles obtained from glycerol monomethacrylate and a crosslinking polyvinyl compound, which has a hydrophobic functional group having 4 or more carbon atoms being mainly bonded to the glycerol monomethacrylate via an oxygen atom derived from a hydroxyl group of said glycerol monomethacrylate.

2. Crosslinked copolymer particles as claimed in claim 1, wherein said crosslinking polyvinyl compound is a polymethacrylic ester of a polyhydric alcohol.

3. Crosslinked copolymer particles as claimed in claim 1, wherein said crosslinking polyvinyl compound is selected from the group consisting of ethylene glycol dimethacrylate, triethylene glycol dimethacrylate, glycerol dimethacrylate, and trimethylolpropane trimethacrylate.

4. Crosslinked copolymer particles as claimed in claim 1, wherein said hydrophobic functional group is an alkyl or acyl group having from 4 to 20 carbon atoms.

5. A process for producing crosslinked copolymer particles comprising reacting hydrophilic crosslinked copolymer particles obtained from glycerol monomethacrylate and a crosslinking polyvinyl compound with a reagent selected from the group consisting of alkyl halides, aralkyl halides, carboxylic acid halides and carboxylic acid anhydrides having from 4 to 20 carbon atoms wherein sad hydrophilic crosslinked copolymer particles are swelled in an organic solvent selected from the group consisting of aromatic hydrocarbons, ethers, N-(alkyl-substituted) formamide and alkyl sulfoxides.

6. A process as claimed in claim 5, wherein said reagent is used in an amount of from 0.01 to 3 equivalents to the glycol residual group of the hydrophilic crosslinked copolymer particles.

7. A process as claimed in claim 5, wherein the hydrophilic crosslinked copolymer particles are reacted with the reagent in the presence of a basic substance.

8. A process as claimed in claim 5, wherein said basic substance is selected from tertiary amines and is used in an amount of from 0.1 to 3 equivalents to the reagent.

9. Crosslinked copolymer particles as claimed in claim 1, wherein said hydrophilic crosslinked copolymer particles are produced by suspension polymerization of glycerol monomethacrylate and a crosslinking polyvinyl compound in the presence of at least one organic solvent selected from the following (A) and (B);
(A) a monohydric alcohol having from 5 to 14 carbon atoms;
(B) a mono- or multi-valent ester having a solubility parameter of from 8 to 11 $(cal/cm^3)^{\frac{1}{2}}$;
the solubility parameter is defined by the following formula:

$$\left[\frac{\Delta E \text{ (molar heat of evaporation)}}{V \text{(molar volume)}}\right]^{\frac{1}{2}}.$$

10. Crosslinked copolymer particles as claimed in claim 9, wherein said organic solvent is selected from 1-hexanol, cyclohexanol, 1-octanol, decanol, dodecanol, and tetradecanol.

11. Crosslinked copolymer particles as claimed in claim 9, wherein said organic solvent is cyclohexanol.

12. Crosslinked copolymer particles as claimed in claim 9, wherein said organic solvent is used in an amount of from 30 to 300% by weight based on the total weight of glycerol monomethacrylate and the crosslinking polyvinyl compound.

13. Crosslinked copolymer particles as claimed in claim 9, wherein said crosslinking polyvinyl compound is a polymethacrylic ester of a polyhydric alcohol and is used in an amount of from 15 to 80% by weight based on the total weight of glycerol monomethacrylate and said crosslinking polyvinyl compound.

14. Crosslinked copolymer particles as claimed in claim 9, wherein said crosslinking polyvinyl compound is ethylene glycol dimethacrylate and is used in an amount of from 20 to 70% by weight based on the total weight of glycerol monomethacrylate and said crosslinking polyvinyl compound.

15. Crosslinked copolymer particles as claimed in claim 9, wherein said crosslinking polyvinyl compound is glycerol dimethacrylate and is used in an amount of from 40 to 80% by weight based on the total weight of glycerol monomethacrylate and said crosslinking polyvinyl compound.

16. Crosslinked copolymer particles as claimed in claim 9, wherein said hydrophilic crosslinked copolymer particles have a specific surface area of from 30 to 500 $m^2/g$.

* * * * *